A. GROSSMANN.
GAS LAMP LIGHTING AND EXTINGUISHING SYSTEM.
APPLICATION FILED DEC. 16, 1908.

931,412.

Patented Aug. 17, 1909.
5 SHEETS—SHEET 2.

Witnesses
J. P. Davis
C. E. Holske

Inventor
August Grossmann
By Munn & Co.
Attorneys

A. GROSSMANN.
GAS LAMP LIGHTING AND EXTINGUISHING SYSTEM.
APPLICATION FILED DEC. 16, 1908.

931,412.

Patented Aug. 17, 1909.

Witnesses
J. P. Davis
C. E. Holske

Inventor
August Grossmann
By
Attorneys

A. GROSSMANN.
GAS LAMP LIGHTING AND EXTINGUISHING SYSTEM.
APPLICATION FILED DEC. 16, 1908.

931,412.

Patented Aug. 17, 1909.
5 SHEETS—SHEET 4.

Witnesses
J.P. Davis
C.E. Holske

Inventor
August Grossmann
By Munn&Co
Attorneys

UNITED STATES PATENT OFFICE.

AUGUST GROSSMANN, OF RHEYDT, GERMANY, ASSIGNOR TO KABELWERK RHEYDT ACTIEN-GESELLSCHAFT, OF RHEYDT, GERMANY.

GAS-LAMP LIGHTING AND EXTINGUISHING SYSTEM.

No. 931,412.      Specification of Letters Patent.      Patented Aug. 17, 1909.

Application filed December 16, 1908. Serial No. 467,731.

*To all whom it may concern:*

Be it known that I, AUGUST GROSSMANN, a citizen of the Empire of Germany, residing at Rheydt, in the Empire of Germany, have invented a new and useful Gas-Lamp Lighting and Extinguishing System, of which the following is a specification.

My invention relates to improvements in systems for lighting and extinguishing gas-lamps over distance, in which no pilot-burners but spark-gaps are employed for igniting the gas or mixture of air and gas.

In order to avoid in opposition to known devices every contact between the primary circuit of the induction coil and the casing of the mechanism in each gas-lamp I connect the primary circuit of the induction coil and the circuit of the electromagnetical device in multiple with the two binding posts, and I supply the current to the spark-gap through a special insulated conductor forming part of the secondary circuit. I provide means for closing the primary circuit of the induction coil only during the period in which the sparks are required for igniting the gas or mixture of air and gas, that is during the opening of the gas-cock or valve, so that afterward the primary circuit is automatically opened. The plug of the gas-cock or its equivalent is turned only in one direction by means of a ratchet wheel, which is operated from the electromagnetical device by means of its armature and a pawl. The said means for closing the primary circuit of the induction coil consist of a contact screw inserted in the primary circuit and forming a cut-out, and of an insulated piece provided on the ratchet wheel and adapted to press the contact spring against the contact screw for closing the circuit. In order to render the action of the induction coil reliable and safe, I provide a second similar cut-out in the primary circuit and a pusher of insulating material connected with the said pawl and adapted to press the contact spring of the second cut-out against its contact screw. The spark-gap is specially constructed according to my invention.

Each gas-lamp may comprise either one single burner or several burners. The automatic lighters and extinguishers of the several gas-lamps are connected in series. According to their number the lamps may be arranged in groups, in each of which the lamps are connected in series. The current for the automatic lighters and extinguishers may be supplied from some source by means of a main circuit including the series of lamps; or the several groups of lamps may be connected in multiple with the main circuit. The said source of current may be disposed at the central station and a known clockwork or other device may be inserted in the main circuit and arranged for circulating consecutive impulses through the system so formed at predetermined points of time. All of the lamps are preferably lighted at the same moment, but are extinguished severally at different moments. Where so preferred, a big source of current may be disposed at the central station and connected with the main circuit by a relay, while a smaller source of current is disposed at the central station and is connected with the relay by means of a local circuit, in which the clockwork or other device is inserted. Or the current for the automatic lighters and extinguishers may be derived from an existing strong current distributing system by means of relays, which are connected in series with one another and with the source of current and the clockwork or the like at the central station proper.

I will now proceed to describe my invention with reference to the accompanying drawings, in which—

Fig. 12 is a diagram of the parts shown at Fig. 1, Figs. 13 to 18 show different positions of a third gas-cock or valve for two burners, of which one is to burn during apart of the night only and the other burner is to burn during the whole night.

Similar characters of reference refer to similar parts throughout the several views.

All the gas-lamps comprised in the system may have one or two or more burners and are preferably provided with incandescent mantles. An example is shown at Figs. 1 to 4, which refer to a gas-lamp with a single burner. The supply gas tube 33 is shown as connected with a gas-cock 2 and the latter in turn with the burner 34 by means of a tube 35 and two screwed parts 36 and 37. Between the flanges of the gas-tube 33 and gas-cock 2 is fastened a plate 38 for supporting a casing 39 with the two electromagnets 10 and a casing 23 with the induction coil 18 and a condenser 21. A shaft 6 is mounted in the casing 39 to turn and is in any known manner so coupled with the plug 1 of the gas-cock 2 as to take the same along with it on being turned. The shaft 6 carries on its inner end a large ratchet wheel 3 and on its outer end an indicator 40 moving over a scale 41 and indicating thereby the angle in degrees. As can be seen from Fig. 12 the armature 5 is assumed to be pivoted in the casing 39 and provided on its free end with a projection 42 (Fig. 1), which passes through a slot 43 (Fig. 3) and carries a vertical rod 44 pivoted to it and guided at 45. The upper part of the rod 44 is bent, as is clearly shown at Fig. 1 and carries a pawl 4 and a pusher 13 of insulating material. The pawl 4 engages the teeth of the ratchet wheel 3 and the rod 44 is pressed toward the latter by a helical spring 46. Another rod 47 pivoted to the casing 39 and guided at 48 carries a pawl 49 engaging the ratchet wheel 3 and is pressed toward the latter by a helical spring 50. It will be understood, that the ratchet wheel 3 can be turned only in one direction, and that the electromagnets 10 on being energized will attract their armature 5, so that the pawl 4 will feed the ratchet wheel 3 one tooth forward, while the other pawl 49 rides over the back of the respective tooth until it engages in the following space. On the electromagnets 10 becoming without current, the armature 5 will by reason of its weight drop, so that the pawl 4 rides over the back of the respective tooth until it engages in the following space, the ratchet wheel 3 being during this period prevented from moving by the other pawl 49.

Figure 3:
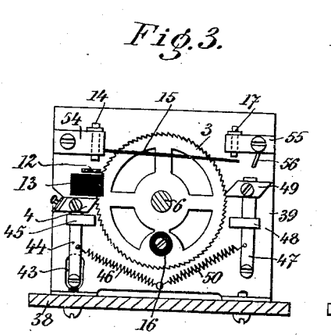
Fig. 3 is a vertical section through the line A—B in Fig. 2.
Figure 4:
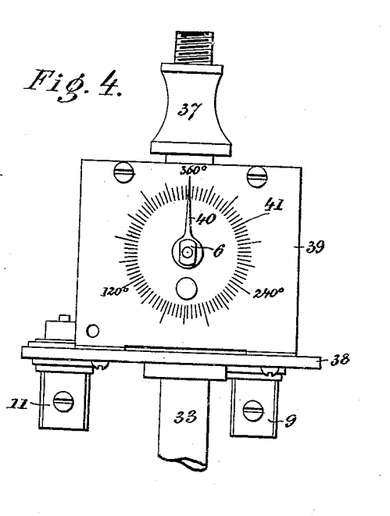
Fig. 4 is an elevation of the parts shown at Fig. 2, when looked at in the direction from left to right.
Figure 6:
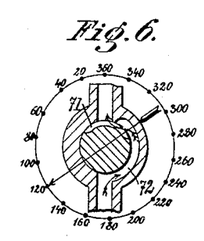
Figs. 6 to 8 show different positions of a gas-cock or valve for a single burner, which is adapted to burn say for the evening and a part of the night only.
Figure 7:
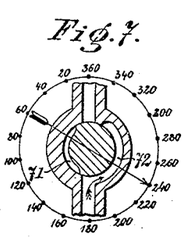
Figure 8:
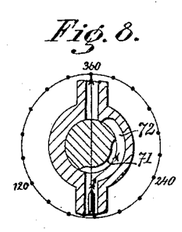
Figure 9:
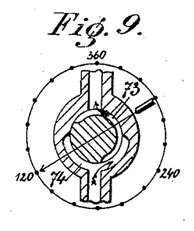
Figs. 9 to 11 show similar positions of another gas-cock or valve for a single burner, which is adapted to burn during the whole night.

Two binding posts 9 and 11 (Figs. 4 and 12) are fastened on the plate 38 and are electrically connected with the winding of the electromagnets 10 by lines 51 and 52 respectively. The binding post 9 is moreover electrically connected with a support 53 carrying a contact spring 12, which latter normally rests on the pusher 13 mentioned above. A bracket 54 fastened on the casing 39 and insulated therefrom carries a contact screw 14 and a contact spring 15. Another bracket 55 fastened on the casing 39 and insulated therefrom carries a contact screw 17 and is electrically connected by a line 56 with a bracket 57 fastened on the inside of the casing 23 and insulated therefrom. The other bent end of the bracket 57 carries a contact screw 19 and is in any known manner electrically connected with one pole of the condenser 21 by a line 58. Another bracket 59 fastened on the inside of the casing 23 and insulated therefrom carries the hammer of the induction coil 18, viz. a pendent contact spring 20, which normally bears against the contact screw 19 mentioned above and carries the armature 20$^a$. The bracket 59 is in any known manner connected with the other pole of the condenser 21 by a line 60 (Fig. 2). One end of the primary winding of the induction coil 18 is electrically connected with the bracket 59 by a line 61 and the other end with the binding post 11 by a line 62. The parts 53, 12, 14, 54, 15, 17, 55, 56, 57, 19, 20, 59, 61 and 62 form in combination with the primary coil the primary circuit of the induction coil 18. It will be seen, that the circuit of the electromagnets 10 and the said primary circuit are connected in multiple with the two binding posts 9 and 11. The parts 12 and 14 form the first cut-out and the parts 15 and 17 the second cut-out in the primary circuit. The first cut-out 12, 14 can be closed by the pusher 13 in the manner described above on the electromagnets 10 being energized. The second cut-out 15, 17 can be closed in the following manner. The ratchet wheel 3 carries insulated from it a roller 16 or this roller or its equivalent may be made from insulating material (Fig. 3). During the rotation of the ratchet wheel 3 through an angle of say 30° or 40° the roller 16 will press the contact spring 15 against the contact screw 17 while bending the former.

Figure 12:
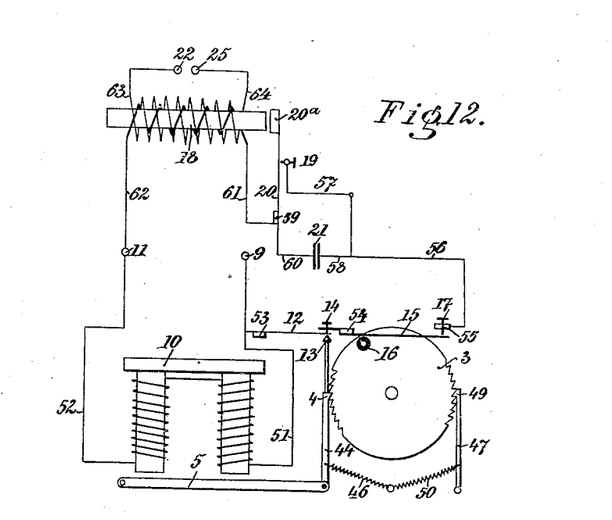
Figure 13:
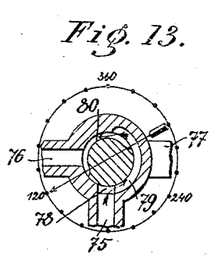
Figure 14:
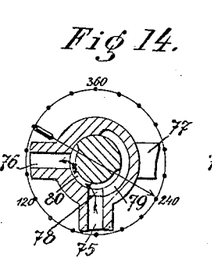
Figure 15:
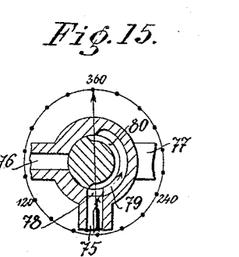
Figure 16:
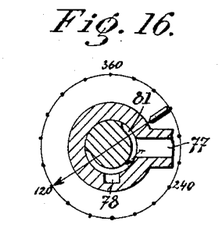
Figure 17:
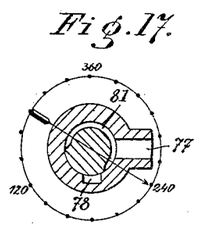
Figure 18:
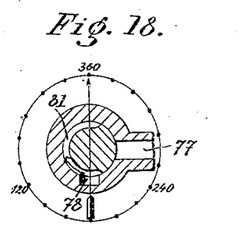

As long as the second cut-out 15, 17 is in its normal position shown at Figs. 3 and 12, any impulse entering the binding post 9 will only pass through the circuit of the electromagnets 10 to the other binding post 11. Then the energized electromagnets 10 will attract their armature 5 and feed the ratchet wheel 3 one tooth forward; at the same time the pusher 13 connected with the rod 44 will push the contact spring 12 against the contact screw 14, in other words it will close the first cut-out 12, 14. However the primary circuit will not be thereby closed, as the second cut-out 15, 17 is still open. When the impulse ceases, the electromagnets becoming without current will release their armature 5. Obviously a number of impulses equal to the number of the teeth of the ratchet wheel 3 requires to be sent through the electromagnets 10 for feeding the ratchet wheel 3 forward tooth for tooth until it completes one revolution. When the roller 16 closes the second cut-out 15, 17, each impulse will first energize the electromagnets 10 and close by their armature 5 and the parts 44, 13 the first cut-out 12, 14, whereupon a part of the impulse passes through the primary circuit now closed by the two cut-outs 12, 14 and 15, 17 for operating the induction coil 18.

Figures 1, 5:
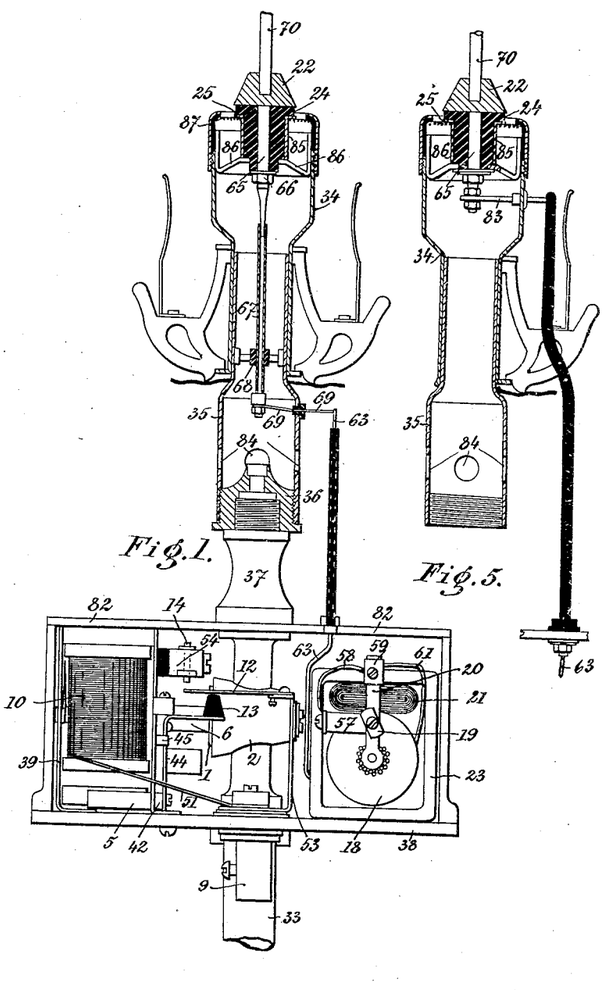
Figure 1 is an elevation of an incandescent gas-lamp with an electromagnetical device and an induction coil, the burner with the spark-gap being shown in section, and the incandescent mantle with a part of its support being omitted.
Fig. 5 is similar to Fig. 1 and shows a modified burner.
Figure 2:
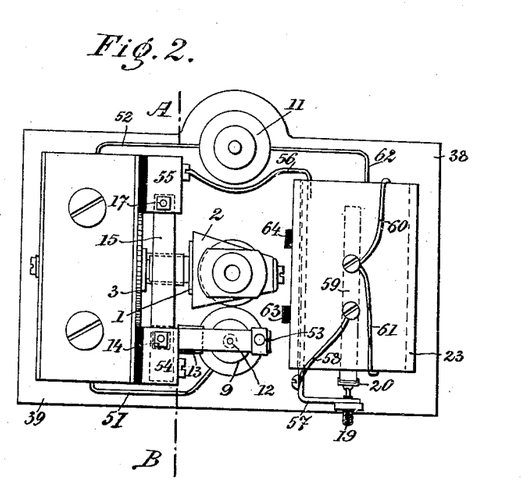
Fig. 2 is a plan view of the same, the burner and a bridge over the electromagnetical device and induction coil being omitted.

The secondary circuit of the induction coil 18 is constructed as follows. Two parallel vertical rods 63 and 64 fastened on the outside of the casing 23 and insulated therefrom are connected with the two ends of the secondary winding of the induction coil 18. In Fig. 1 only the rod 63 is visible as the other rod 64 is covered by it. Above the bridge 82 both rods 63 and 64 are mostly covered with an insulating material. A metallic disk 22 is fastened on the burner 34 and is insulated therefrom, it resting on an annular piece 24 of soapstone or other insulating material and its shank 65 passing through the piece 24 and being therein secured by a nut 66. The said shank 65 is shown as terminating in a tapering point which is in electrical contact with a metallic tube 67 secured in the axis of the tube 35 by means of a cross piece 68 of insulating material. The lower end of the tube 67 is electrically connected with the rod 63 by a line 69, which passes through a hole in the tube 34 and is insulated from the latter. The disk 22 forms one terminal of a spark-gap, the other terminal of which is formed by a tube 85 surrounding the piece 24 and provided with a flange 25. The tube 85 is electrically connected with the other rod 64 by means of arms, the burner 34, the tube 35 and a line, which is not visible in Fig. 1, as it is covered by the external part of the line 69. The ordinary metallic sieve 87 at the top of the burner 34 is therefrom insulated and may be fastened on the flange 25 as shown. During the passage of an impulse through the primary circuit sparks will be produced between the two terminals 22 and 25 (see also Fig. 12) and serve for igniting the mixture of gas and air, which is formed in the mixing chamber within the tubes 34 and 35 and passes upward through the sieve 87.

70 denotes a part of a support for the incandescent mantle not shown. The condenser 21 serves for increasing the sparks generated by closing the circuit and for decreasing the sparks generated by opening the circuit, as is well known. It forms no part of my invention.

The electromagnetical device described is substantially the same for every gas-lamp comprised in the system, no matter, whether it has only one burner or several burners. Certain modifications of the device in the latter case will be hereinafter described. The gas-cocks and their plugs will have to be varied in construction in accordance with the points of time, at which the gas is to be lighted and the light is to be extinguished.

Figure 10:
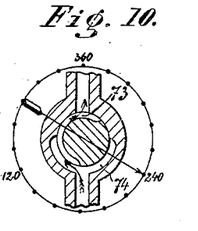
Figure 11:
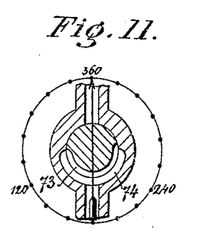

Figs. 6 to 11 illustrate for example the construction of two gas-cocks, by means of which the gas is to be turned on and ignited simultaneously, but to be shut off at two different times. In one gas-cock (Figs. 6 to 8) the plug 1 is provided with a recess 71 on its periphery and the casing 2 is provided with a recess 72 in its inside, while in the other gas-cock (Figs. 9 to 11) the two differently shaped and disposed recesses 73 and 74 respectively are provided. All the figures show the plug 1 in three different positions marked by the arrow, all the positions being displaced to one another by an angle of 120°. When the plugs of the two gas-cocks occupy the position shown at Figs. 8 and 11 respectively, the gas is shut off. After a rotation of the two plugs by means of their ratchet wheels 3 through an angle of 120° (Figs. 6 and 9) the gas is permitted by both cocks to pass upward to the burners and to burn. After a further rotation of the plugs of both cocks through an angle of 120°, i. e. from 120° to 240° (Figs. 7 and 10), the plug of the first cock will have shut off the gas (Fig. 7), while the plug of the second cock will permit the gas to pass on (Fig. 10). After a further rotation of both plugs through an angle of 120°, i. e. from 240° to 360° (Figs. 8 and 11) also the second plug will have shut off the gas (Fig. 11). A lamp provided with the cock according to Figs. 6 to 8 will then burn in the evening and during a part of the night only, so that it may be called an "evening-lamp". A lamp provided with the other cock according to Figs. 9 to 11 will on the contrary burn during the whole night and may be for this reason called a "night-lamp". The points in the outer circles shown at Figs. 6 to 11 mark for example the various positions of the plugs during the feed of their ratchet wheels 3 tooth after tooth, their number being equal to that of the teeth of these wheels.

When the gas-cock is to simultaneously supply gas to two burners and to shut off the gas at two different times, its construction will require to be altered. Figs. 13 to 18 illustrate for example the construction of such a gas-cock. It is assumed to have three passages 75, 76, 77, of which one horizontal passage 76 is in the same plane as the lower vertical passage 75 and the other horizontal passage 76 is in another plane parallel to the first one and is placed in communication with the lower passage 75 by a bent recess 78, while the recess 79 in the casing communicating with the lower passage 75 is in the same plane as the latter. The plug is on its periphery provided with two recesses in the said two parallel planes, viz. one recess 80 in the plane of the two passages 75 and 76 and the other recess 81 in the plane of the other horizontal passage 77. For the position of the plug shown at Figs. 15 and 18 the gas is shut off from both burners. After a rotation of the plug through an angle of 120° to the position shown at Figs. 13 and 16 the gas is simultaneously turned on to the two burners through the passages 76 and 77. After a further rotation of the plug through an angle of 120°, viz. from 120° to 240° (Figs. 14 and 17) the gas is shut off from the right burner and is still permitted to pass to the left burner. After a further rotation of the plug from 240° to 360° (Figs. 15 and 18) the gas will be shut off from both burners. Of course the secondary coil of the induction coil 18 will in this case require to be divided into two parts, each of which is electrically connected with the terminals 22 and 25, 85 of the corresponding burner, or the secondary coil may be connected with the terminals of the two burners in any other known manner.

In case any lamp is to comprise more than two burners, it will be obvious to any one acquainted with the art to which this invention belongs, how the gas-cock and its plug or a gas valve can be constructed for attaining the effects described above. It is essential, that the plug 1 of the gas-cock receives as many parallel recesses, as there are burners, if the latter are all to be extinguished consecutively and at different moments. In case several burners connected with a single gas-cock are to be lighted at the same time, but their lights are to be extinguished at different times, the number of these points of time being $n$, the circle similar to the one shown at Figs. 13 to 18 requires to be divided by $n+1$ so that the plug will require to occupy $n+1$ different principal positions, in the first one of which the gas is turned on to all of the burners, in the second one of which the gas is permitted to pass on to $n$ burners only, in the third one of which the gas is permitted to pass on to $n-1$ burners only and so on, while in the last principal position of the plug the gas is shut off from all of the burners. The recesses on the periphery of the plug and in the inside of the cock casing will then require to be modified in an obvious manner. Where so preferred, the recesses in the gas-cocks and in their plugs, such as 71, 72, 73, 74, 79, 80, 81, may be so shaped or tapered at their ends as to permit the gas to pass on to the burner or burners only in a gradually increasing quantity, until the cock is quite opened, and equally to shut off the gas gradually during the intermittent rotation of the plug.

In Fig. 1 a bridge 82 is shown as provided for more rigidly connecting the plate 38 with the gas-cock. Of course the construction of this frame may be varied.

Fig. 5 shows a slight modification of Fig. 1, the two rods 63 and 64 (Fig. 2) being lengthened upward and the one 63 of them being directly connected with the shank 65 by means of a suitable conductor 83 and the other rod 64 connected with the burner 34 by a line (not shown, as it is covered by the conductor 83). However I do not bind myself to the construction shown of the burner as well as of the electromagnetical device and induction coil. The casing 23 is preferably made from an insulating material, but I have not shown this in the drawings, so as to render the latter intelligible.

Figures 19, 20:
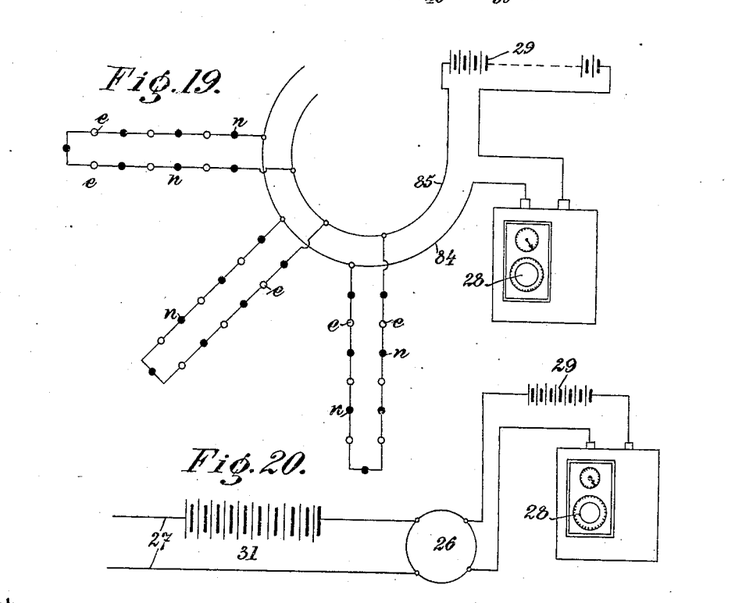
Fig. 19 shows diagrammatically a system with three groups of gas-lamps.
Fig. 20 shows a modification of the preceding system.

The binding posts 9 and 11 of the several gas-lamps described above are to be connected in series. Where so preferred, the gas-lamps may be arranged in groups, in each of which the lamps are connected in series. The system may comprise a suitable source of current, for example a battery 29 shown at Fig. 19, and a clockwork 28 of any known construction, both disposed at some central station, and two main lines 84 and 85 with which the several series of lamps are connected in multiple as is clearly shown. The white points $e$ may mark the "evening-lamps" and the black points $n$ the "night-lamps". The clockwork 28 is in a known manner arranged to operate at determined points of time, for example at three different points of time in 24 hours for the constructions shown at Figs. 6 to 11 and Figs. 13 to 18, for sending as many consecutive impulses through the system as the ratchet wheels 3 of all lamps require to be fed tooth for tooth forward for each period, so as to bring the plugs of all gas-cocks into their principal positions, such as are marked by the arrow in Figs. 6 to 11 and Figs. 13 to 18. Obviously during the first period, that is during the rotation of the plugs 1 from their initial position to the next following principal position, or say from the position in Fig. 8 to the position in Fig. 6, first the roller 16 on the ratchet wheel 3 of every lamp must close the second cut-out 15, 17 in order to enable a part of each impulse to operate the induction coil 18 for producing sparks between the terminals 22 and 25, 85, and then the plug 1 gradually turns on the gas, which in mixture with the air entering the mixing chamber through openings 84 is at once ignited by the sparks, and before the end of the said first period the roller 16 must again release the contact spring 15 and thus open the primary circuit of the induction coil 18, so that no more sparks can be produced during the following periods. Of course the clockwork 28 may be replaced by a relay or any other device by means of which the electromagnetical devices of the several lamps can be operated at any desired moment. Where so preferred, the system may be modified in that a local circuit at the central station can operate a relay 26 of any known construction, Fig. 20, which is connected in series with a special big source of strong current 31 and the two main lines 27, all of them forming the main circuit. The several groups of lamps (similar to Fig. 19) connected in multiple with the main circuit can then be operated in a manner similar to the one described above.

Figure 21:
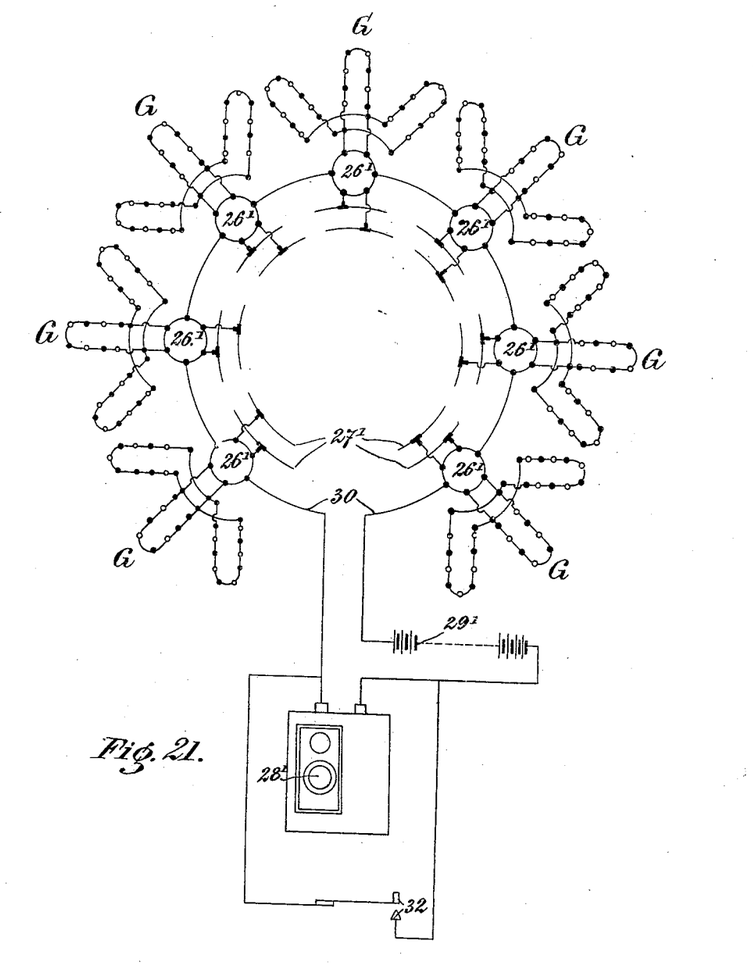
Fig. 21 shows diagrammatically another modification of the system.

For greater towns with electric central stations it may be preferable to connect various groups G of lamps (Fig. 21) severally in multiple with the distributing system 27' by means of relays 26' of any known construction, and to operate all of the relays 26' from the central station by means of a ring circuit 30 including a source of current 29' and connected in multiple with a clockwork 28' and a switch 32 or key. Then the clockwork 28' will at given times consecutively and momentarily close the circuit 30 for operating the relays 26', which in turn momentarily close the several circuits G by permitting the current to pass from the distributing system 27' through them, so that the electromagnetical devices of the lamps connected in series in each group G can be operated in the manner described above. The ring circuit 30 can also at any moment be intermittently closed by hand with the aid of the switch 32 or key or the like for operating the system.

I claim:

1. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including the primary coil of the induction coil, a spark-gap on the burner, a secondary circuit including the secondary coil of the induction coil and the spark-gap, its part leading to the latter being insulated, a ratchet wheel connected with the plug of the gas-cock and provided with means for closing the primary circuit during a part of its complete revolution, and means controlled from the electromagnetical device for feeding the ratchet wheel intermittently.

2. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including two cut-outs and the primary coil of the induction coil, a spark-gap on the burner, a secondary circuit including the secondary coil of the induction coil and the spark-gap, its part leading to the latter being insulated, a ratchet wheel connected with the plug of the gas-cock and provided with means for closing one of the two cut-outs during a part of its complete revolution, a pawl checking the return of the ratchet wheel, and a second pawl controlled from the electromagnetical device for feeding the ratchet wheel intermittently and provided with means for momentarily closing the other cut-out in the primary circuit.

3. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with two binding posts and including the primary coil of the induction coil, two cut-outs inserted in the primary circuit and each consisting of a contact spring and a contact screw, a spark-gap on the burner, a secondary circuit including the secondary coil of the induction coil and the spark-gap, its part leading to the latter being insulated, a ratchet wheel connected with the plug of the gas-cock and provided with an insulated piece which is adapted to press one of the two contact springs against its contact screw during a part of the complete revolution, a pawl checking the return of the ratchet wheel, and a second pawl controlled from the electromagnetical device for feeding the ratchet wheel intermittently and provided with an insulated piece which is adapted to momentarily press the other contact spring against its contact screw for momentarily closing the primary circuit.

4. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including the primary coil of the induction coil, a spark-gap on the burner, a secondary circuit including the secondary coil of the induction coil and the spark-gap, its part leading to the latter being insulated, a ratchet wheel connected with the plug of the gas-cock and provided with means for closing the primary circuit during a part of its complete revolution, and means controlled from the electromagnetical device for feeding the ratchet wheel intermittently, the gas-cock being provided with a recess in its casing and with a recess in the periphery of its plug, these two recesses being at right angles to the axis of the plug in the plane of the inlet and outlet and being so disposed and proportioned, as to establish a communication between the inlet and the outlet during the turn of the plug through one part of its complete revolution and to stop this communication during the other part of the revolution.

5. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including two cut-outs and the primary coil of the induction coil, a spark-gap on the burner, a secondary circuit including the secondary coil of the induction coil and the spark-gap, its part leading to the latter being insulated, a ratchet wheel connected with the plug of the gas-cock and provided with means for closing one of the two cut-outs during a part of its complete revolution, a pawl checking the return of the ratchet wheel, and a second pawl controlled from the electromagnetical device for feeding the ratchet wheel intermittently and provided with means for momentarily closing the other cut-out in the primary circuit, the gas-cock being provided with a recess in its casing and with a recess in the periphery of its plug, these two recesses being at right angles to the axis of the plug in the plane of the inlet and outlet and being so disposed and proportioned, as to establish a communication between the inlet and the outlet during the turn of the plug through one part of its complete revolution and to stop this communication during the other part of the revolution.

6. In a gas-lamp lighting and extinguishing system, the combination with conductors, of means for sending at given points of time a plurality of consecutive impulses through said conductors, and a plurality of gas-lamps, of which each comprises a gas-cock, a burner connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including the primary coil of the induction coil, two cut-outs inserted in the primary circuit and each consisting of a contact spring and a contact screw, a spark-gap on the burner, a secondary circuit including the secondary coil of the induction coil and the spark-gap, its part leading to the latter being insulated, a ratchet wheel connected with the plug of the gas-cock and provided with an insulated piece which is adapted to press one of the two contact springs against its contact screw during a part of the complete revolution, a pawl checking the return of the ratchet wheel, and a second pawl controlled from the electromagnetical device for feeding the ratchet wheel intermittently and provided with an insulated piece which is adapted to momentarily press the other contact spring against its contact screw for momentarily closing the primary circuit, the gas-cock being provided with a recess in its casing and with a recess in the periphery of its plug, these two recesses being at right angles to the axis of the plug in the plane of the inlet and outlet and being so disposed and proportioned, as to establish a communication between the inlet and the outlet during the turn of the plug through one part of its complete revolution and to stop this communication during the other part of the revolution.

7. In a gas-lamp lighting and extinguishing system, the combination with conductors, of means for sending at given points of time a plurality of consecutive impulses through said conductors, and a plurality of gas-lamps, of which each comprises a gas-cock, several burners connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including the primary coil of the induction coil, spark-gaps on the burners, secondary circuits including parts of the secondary coil of the induction coil and the spark-gaps, their parts leading to the latter being insulated, a ratchet wheel connected with the plug of the gas-cock and provided with means for closing the primary circuit during a part of its complete revolution, and means controlled from the electromagnetical device for feeding the ratchet wheel intermittently, the gas-cock being provided with recesses in its casing and with a number of recesses in the periphery of its plug at right angles to its axis and in parallel planes, the several recesses being so disposed and proportioned, as to establish a communication between the common inlet and all of the outlets during the turn of the plug through parts of its complete revolution for the several burners and to stop this communication during the respective rests of the revolution according to the condition that the burners are respectively to be lighted and extinguished at given moments.

8. In a gas-lamp lighting and extinguishing system, the combination with conductors, of means for sending at given points of time a plurality of consecutive impulses through said conductors, and a plurality of gas-lamps, of which each comprises a gas-cock, several burners connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including two cut-outs and the primary coil of the induction coil, spark-gaps on the burners, secondary circuits including parts of the secondary coil of the induction coil and the spark-gaps, their parts leading to the latter being insulated, a ratchet wheel connected with the plug of the gas-cock and provided with means for closing one of the two cut-outs during a part of its complete revolution, a pawl checking the return of the ratchet wheel, and a second pawl controlled from the electromagnetical device for feeding the ratchet wheel intermittently and provided with means for momentarily closing the other cut-out in the primary circuit, the gas-cock being provided with recesses in its casing and with a number of recesses in the periphery of its plug at right angles to its axis and in parallel planes, the several recesses being so disposed and proportioned, as to establish a communication between the common inlet and all of the outlets during the turn of the plug through parts of its complete revolution for the several burners and to stop this communication during the respective rests of the revolution according to the condition that the burners are respectively to be lighted and extinguished at given moments.

9. In a gas-lamp lighting and extinguishing system, the combination with conductors, of means for sending at given points of time a plurality of consecutive impulses through said conductors, and a plurality of gas-lamps, of which each comprises a gas-cock, several burners connected with the gas-cock, a casing, two insulated binding posts inserted in said conductors, an electromagnetical device insulated from the casing and connected with the two binding posts, an induction coil insulated from the casing, a primary circuit insulated from the casing and connected with the two binding posts and including the primary coil of the induction coil, two cut-outs inserted in the primary circuit and each consisting of a contact spring and a contact screw, spark-gaps on the burners, secondary circuits including parts of the secondary coil of the induction coil and the spark-gaps, their parts leading to the latter being insulated, a ratchet wheel connected with the plug of the gas-cock and provided with an insulated piece which is adapted to press one of the two contact springs against its contact screw during a part of the complete revolution, a pawl checking the return of the ratchet wheel, and a second pawl controlled from the electromagnetical device for feeding the ratchet wheel intermittently and provided with an insulated piece which is adapted to momentarily press the other contact spring against its contact screw for momentarily closing the primary circuit, the gas-cock being provided with recesses in its casing and with a number of recesses in the periphery of its plug at right angles to its axis and in parallel planes, the several recesses being so disposed and proportioned, as to establish a communication between the common inlet and all of the outlets during the turn of the plug through parts of its complete revolution for the several burners and to stop this communication during the respective rests of the revolution according to the condition that the burners are respectively to be lighted and extinguished at given moments.

AUGUST GROSSMANN.

Witnesses:
   FRIEDR. CORNELLE,
   EMIL REICHELL.